March 17, 1953

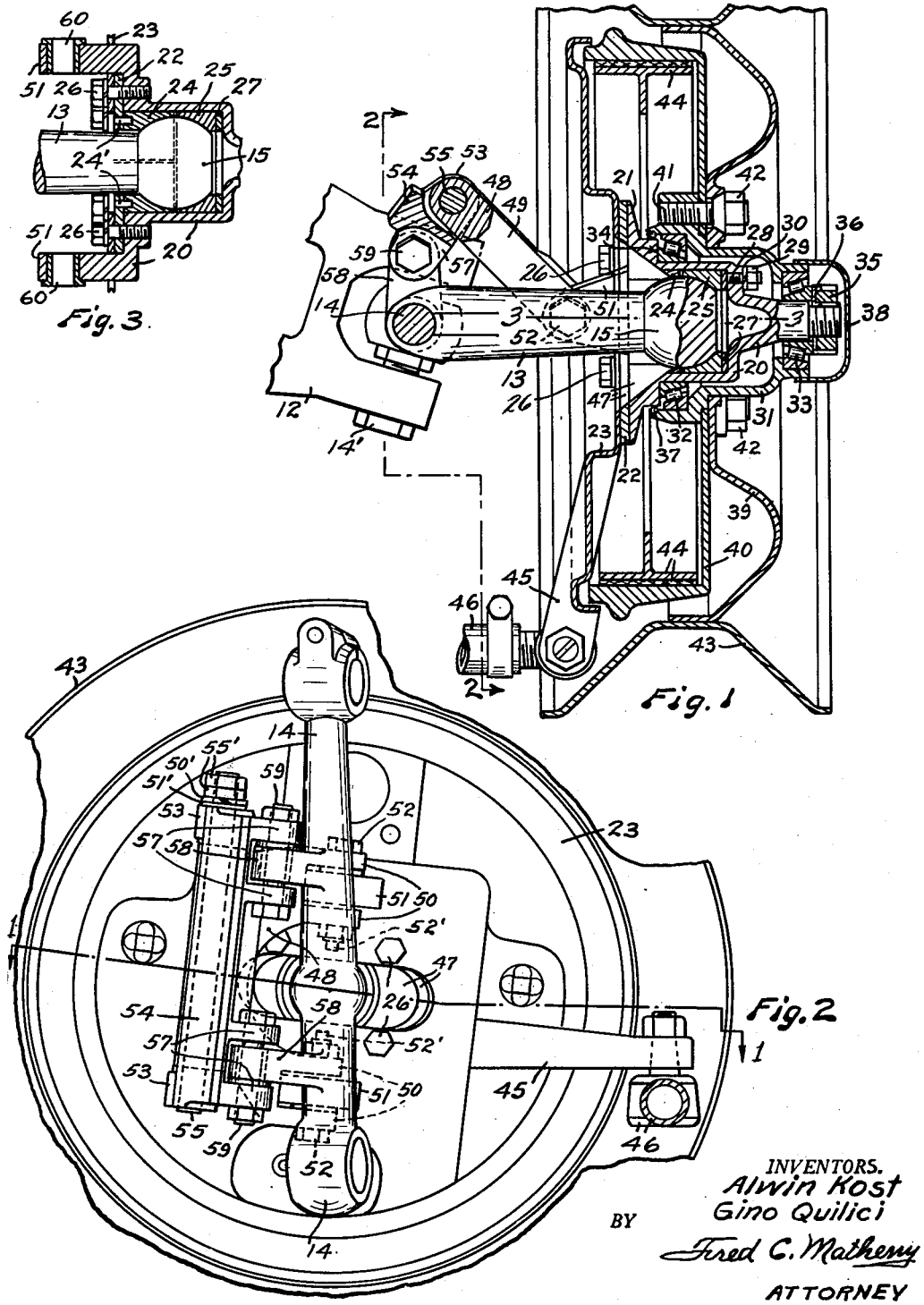

A. KOST ET AL 2,631,867

WHEEL MOUNTING TO PERMIT BANKING
OF VEHICLE DURING STEERING

Filed Feb. 23, 1949

INVENTORS
Alwin Kost
Gino Quilici
BY
Fred C. Matheny
ATTORNEY

Patented Mar. 17, 1953

2,631,867

UNITED STATES PATENT OFFICE 2,631,867

WHEEL MOUNTING TO PERMIT BANKING OF VEHICLE DURING STEERING

Alwin Kost and Gino Quilici, Portland, Oreg., assignors, by direct and mesne assignments, to Kost Multiple X, Inc., Portland, Oreg., a corporation of Oregon Application February 23, 1949, Serial No. 77,932

5 Claims. (Cl. 280—96.3)

This invention relates to motor vehicle wheel mounting means of the type disclosed in the two prior patents of Alwin Kost, No. 2,285,445 and No. 2,373,834.

An object of this invention is to improve the construction of wheel mounting means of the class described in the two prior patents hereinbefore referred to.

Another object of this invention is to provide strong, simple and efficient wheel mounting means which will tilt or bank the two front wheels of a vehicle when the vehicle is being steered around a curve thereby placing the wheels in a better position to resist side thrust and to resist skidding on slippery surfaces when the vehicle is being turned.

When a moving vehicle is being turned on a roadway a portion of the momentum of said vehicle is exerted as a transverse thrust on the wheels of the vehicle. This sometimes results in damaged or broken wheels and may be the cause of accidents. Also it makes necessary slower speed on curves. It is an object of this invention to provide a wheel mounting means by which the wheels of a vehicle will be angularly moved into positions best calculated to resist strains and thrusts, due to turning of the vehicle, and by which maximum stability on curves is obtained thereby minimizing lurching, swaying and skidding of the vehicle and providing greater safety and greater riding comfort.

Other objects are to provide wheel mounting means which will reduce accidents, increase the useful life of wheels, axles, motors and other vehicle parts, provide better and easier steering, give better road adherence and thus reduce the danger of skidding and make possible faster speeds on curves with greater safety.

Another object is to provide wheel mounting means in which a hinge structure having three pivotal axes which are slightly inclined from the vertical is used as a part of the connecting means between the wheel and the vehicle frame to tilt or bank the wheel when said wheel is angularly moved to steer the vehicle.

Other objects of this invention will be apparent from the following description taken in connection with the accompanying drawings.

In the drawings

Figure 1 is a view in horizontal axial section, taken substantially on broken line 1—1 of Fig. 2 with parts broken away and with parts shown in plan, of a wheel mounting means constructed in accordance with this invention.

Fig. 2 is a fragmentary view in elevation, with parts omitted, looking in the direction of broken line 2—2 of Fig. 1.

Fig. 3 is a fragmentary sectional view of parts of an axle, ball, and non-rotatable hub means, taken substantially on broken line 3—3 of Fig. 1, and at right angles to the plane in which the same parts are shown in Fig. 1.

Like reference numerals designate like parts throughout the several views.

Figure 4:
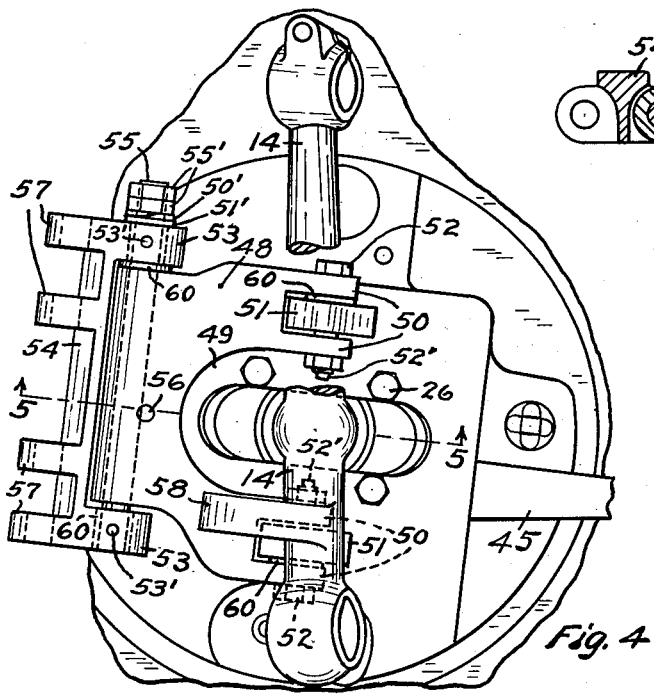
Fig. 4 is a fragmentary view similar to Fig. 2 but with parts omitted and parts of a hinge means oriented into different positions than they would assume when connected with the vehicle for operation.
Figure 5:
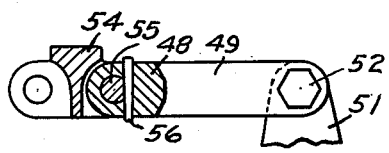
Fig. 5 is a detached assembly view partly in section and partly in elevation showing a fragment of a lug which is connected with a non-rotatable hub together with hinge means all as they might appear if looked at in the direction of broken line 5—5 of Fig. 4.

Referring to Figs. 1 to 5 inclusive, the numeral 12 designates a portion of a vehicle supporting axle, which can be of a conventional type and may be varied in shape and form. 13 designates an axle member which is integral with or otherwise rigidly secured, as by a cross bar 14 and bolt means 14' to the vehicle supporting axle 12. The axle member 13 has a spherical bearing member or ball 15 rigidly secured to the outer end thereof. This ball 15 may be integral with the axle member 13, as shown in Figs. 1 and 3, or it may be separately constructed, as shown in Fig. 6.

Figure 6:
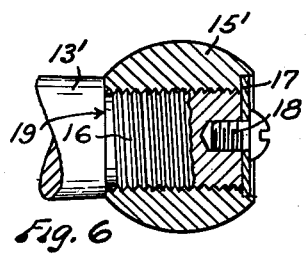
Fig. 6 is a detached fragmentary view partly in section and partly in elevation showing axle and ball means of modified form.

In accordance with the showing in Fig. 6, an axle member 13', which is similar to the axle member 13, has an outer end portion of reduced diameter which is provided with an external left hand thread 16 to receive a separable ball 15'. A lock washer 17 seats against the outer end portion of the ball 15' and is held in place by a screw 18 which is threaded into the axle 13' by the use of right hand threads. The ball 15' is prevented from rotating because any tendency it may have to turn to the left will jam said ball against a shoulder 19 on the axle 15' and any tendency it may have to turn to the right will tend to tighten the screw 18. The balls 15 in Figs. 1 and 3, and 15' in Fig. 6, act only as pivot means about which a wheel can be angularly moved in steering and banking said wheel. These balls do not have any tendency to rotate as the wheels are rotated on bearings independently of the balls, as hereinafter explained.

Referring again to Figs. 1 to 5, a non-rotatable hollow hub 20 extends over and receives the ball 15. The inner end portion of the non-rotatable hub 20 has a flange 21 which is positioned in face to face contact with one side of a disc shaped torque plate 22. A circular brake plate 23 is positioned against the other side of the torque plate 22 and cap screws 26 may be used to rigidly secure the parts 22, 23 and 20 together.

Two bearing members 24 and 25, preferably of "self lubricating" material are provided within the non-rotatable hub 20 and fit closely around the ball 15. The inner bearing member 24, see Fig. 3, may rest against plate means 22 at locations above and below the axle 13 and pins 24' may extend through the plate means 22 and into the bearing 24. This supports the bearing 24 against longitudinal inward movement and against rotary movement. Preferably this inner bearing member 24 is made in two halves, longitudinally considered, to facilitate assembly of said bearing member 24 on the ball 15. Also preferably plate means 22 is made in two halves to facilitate assembly. The outer bearing member 25 is engaged by a washer 27 within the non-rotatable hub 20. Screws 28 are threaded through the non-rotatable hub 20 and engage with the washer 27 to provide adjustment of the bearing members 25 and 24 so they will fit snugly and without lost motion on the ball 15. Jam nuts 29 and lock washers 30 are provided on the screws 28 externally of the non-rotatable hub 20 to hold said screws immovable after they are properly adjusted.

A rotatable hub member 31 is rotatively mounted on the non-rotatable hub member 20, as by inner roller bearings 32 and outer roller bearings 33. The bearings 32 and 33 are the bearings on which a wheel rotates. The inner wheel bearing 32 rests against a shoulder 34 on the non-rotatable hub member 20 and a nut 35 is threaded onto the outer end portion of said non-rotatable hub member to hold the rotatable hub member 31 in place. Locking means, such as a lock washer 36 is provided to lock the nut 35 in place. Preferably a grease retainer ring 37 is provided between the two hub members 20 and 31 near the inner end portion of the hub member 31. Also preferably a hub cap 38 is provided over the nut 35. These parts 37 and 38 cooperate to retain lubricant and exclude dirt.

A wheel disc 39 and brake drum 40 are secured to the rotatable hub member 31, as by stud bolts 41 and nuts 42. The wheel disc 39 has the usual rim 43. Brake shoe means 44, of any suitable type, is provided in the brake drum 40 and connected in the usual manner with the brake plate 23. Preferably at least one lug 45 is provided on the brake plate 23 for connection with a tie rod 46 by which the wheel is pivotally moved about the ball 15 in steering.

The inner bearing member 24 and non-rotatable hub 20 and plate means 22 and brake plate 23 all have registering slots 47 which provide clearance for the passage therethrough of the axle member 13 and further provide clearance so the wheel can be pivotally moved about a generally upright inclined axis in steering and banking the wheel. The shape of these slots are shown in Figs. 1, 2 and 4.

The wheel is pivotally mounted on the ball 15 and devices are provided to compel pivotal movement of the wheel about an axis which is generally upright, but which as considered from its lower portion upwardly is slightly inclined or tilted rearwardly of the vehicle relative to the vertical. This rearward incline relative to the vertical of the pivotal axis of the wheel causes the wheel to incline or tilt from bottom to top thereof in the direction of the turn when said wheel is angularly moved in steering the vehicle.

The devices for supporting the wheel so that it will tilt about an axis which is slightly inclined rearwardly from its lower end portion upwardly between the wheel and the vehicle frame and inwardly from the ball 15. These devices include a hinge plate 48 having a relatively deep U shaped recess 49 extending from its outer edge inwardly to provide clearance for the axle member 13. At the sides of the recess 49 the outer end portion of the hinge plate 48 is provided with forked portions 50 which fit over rigid lugs 51 on the pivot hub 20 and are pivotally secured to said lugs by two aligned bolts 52. The common axis of the two bolts 52 is slightly inclined rearwardly from the lower portion to the upper portion thereof and said axis is positioned in a plane substantially parallel to the medial plane of the wheel.

The inner end portion of the hinge plate 48, shown at the left in Figs. 1, 2 and 4 fits between two lugs 53 of an I shaped hinged shackle 54 and is pivotally connected with the lugs 53 by a pivot pin 55. The axis of pivot pin 55 is slightly inclined rearwardly of the vehicle from lower to upper end thereof. A cross pin 56 secures pivot pin 55 against longitudinal and rotary movement in hinge plate 48. Preferably a bronze thrust washer 51' and a toothed lock washer 50' and jam nuts 55' are provided on the upper end portion of pin 55. The shackle member 54 is further provided with two pairs of lugs 57 which are spaced apart and which project in the opposite direction from the lugs 53. Each pair of shackle lugs 57 fits over and is pivotally connected with another lug 58 by a bolt 59. Each lug 58 is integral with or secured to the cross rod 14, which cross rod 14 is rigidly secured to the vehicle supporting axle 12, as hereinbefore explained. The two bolts 59 have a common axis which is slightly inclined rearwardly of the vehicle from the lower to the upper portion thereof. Bearing tubes 60 can be provided on bolts 52 and pins 55, Fig. 4, and in other places if needed. Also preferably bolts 52 and lugs 53 are provided with grease fittings 52' and 53', Fig. 4, to facilitate lubrication.

The axes of the bolts 52 and pin 55 and bolts 59 are all parallel with each other and are all positioned in planes which are substantially parallel to the medial plane of the wheel and are all inclined rearwardly the same amount, upwardly considered. When the wheels are positioned for straight ahead driving they are kept in proper alignment by the hinge parts 48 and 54 and the tie rod means 46. The wheel is centered with the ball 15 and there is little strain on the tie rod means. When the wheels are pivotally moved by the tie rod means, in steering, they will incline or bank toward the turn. This incline properly banks the wheels to withstand the inertia of the body parts as the turning takes place and to better resist skidding on slippery surfaces. Due to the fact that the front wheels are pivoted on axes which are inclined rearwardly from the lower portion upwardly there will be caster effect tending to return the wheels from an inclined steering position back to a straight ahead driving position.

The operation of this wheel mounting means is as follows: The wheel is pivotally supported for steering movement on the ball 15 and the rotatable portions of the wheel rotate on the roller bearings 32 and 33. The axle member 13 is fixedly supported relative to the vehicle supporting axle or frame part 12. The lugs 58 are rigid with the axle member 13. The hinge members 49 and 54, with pivot members 52, 55 and 59 connect the non-rotatable parts of the wheel with the lugs 58. The pivot members 52, 55 and 59 of the hinge are all parallel with each other and, as respects the true vertical, are all inclined rearwardly of the vehicle from bottom to top thereof, see Fig. 2 in which the front of the vehicle is toward the left. Relative pivotal movement of the two hinge members 49 and 54 allows the wheel to be angularly moved in steering. When the tie rod 46 is longitudinally moved to steer the vehicle each front wheel will pivot on the ball 15 and the hinge members will compel each wheel to angularly move about an upright axis which passes through the ball 15 and which has a similar incline to the axes of the hinge bearings 52, 59 and 55. This compels each wheel to bank or lean from bottom to top toward the direction of the turn. Each front wheel, when thus angularly moved to steer the vehicle, is inclined forwardly and toward the direction of the turn and in this inclined position will be banked or braced against the thrust of the vehicle body and will be in a better position to resist skidding.

The amount of tilt imparted to each wheel is proportional to the angle through which the wheel is moved away from the straight ahead position in steering. As the inner front wheel will take a sharper angle than the outer front wheel in making a turn it will be evident that the inner front wheel will be tilted a greater amount than the outer front wheel.

Figure 7:
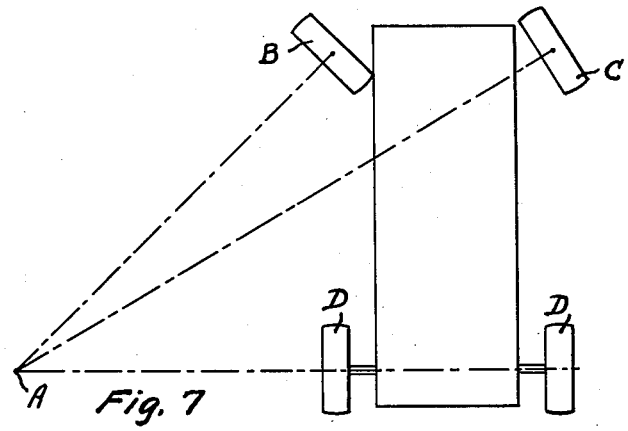
Figs. 7, 8 and 9 are diagrammatic views illustrating the operation of front vehicle wheels mounted in accordance with this invention.
Figure 8:
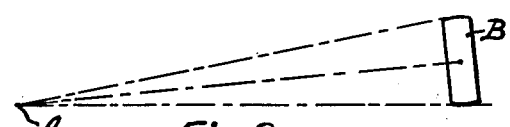
Figure 9:
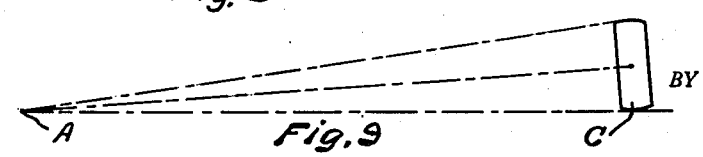

This is illustrated diagrammatically in Figs. 7 8 and 9. Fig. 7 illustrates a motor vehicle which has its front wheels angularly moved through a maximum angle for making a short left turn. The pivot point A about which both front wheels B and C move is on the projected axis of the rear wheels D and to accomplish this it is apparent that the front wheel B nearest to the point A will have to be angularly moved through a greater angle from the straight ahead position than will the front wheel C, which is farthest from the point A. Fig. 8 illustrates the tilt of the wheel B nearest the point A and Fig. 9 illustrates the lesser tilt of the wheel C, both for a sharp left turn as illustrated in Fig. 7. Thus it will be seen that the wheel B is tilted or banked a greater amount than the wheel C in making a left turn and it will be understood that the wheel C is tilted or banked a greater amount than the wheel B in making a right turn.

The foregoing description and accompanying drawings clearly disclose preferred embodiments of this invention but it will be understood that these disclosures are merely illustrative and that changes may be made within the scope and spirit of the following claims.

We claim:

1. A mounting means for a wheel of a motor vehicle comprising an axle member rigid with a frame part of the vehicle; a ball of larger diameter than said axle member on the outer end portion thereof; non-rotatable hub means mounted on said ball for pivotal steering movement; wheel means rotatably mounted on said non-rotatable hub means; and hinge means including two hinge members pivotally connected with each other and pivotally connected respectively with the non-rotatable hub means and with a frame part of the vehicle and positioned inwardly from said ball and between said wheel means and the vehicle frame and connecting said non-rotatable hub means with said axle member and supporting said non-rotatable hub means and said wheel means for oscillating movement about an axis which, from its lower end upwardly is slightly inclined rearwardly of the vehicle relative to the vertical, whereby banking movement of said wheel means is provided simultaneously with steering movement thereof.

2. Mounting means for a wheel of a motor vehicle comprising an axle member rigid with a frame part of the vehicle; a ball of larger diameter than said axle member on the outer end portion thereof; non-rotatable hub means mounted on said ball for oscillating movement thereon; wheel means rotatively mounted on said non-rotatable hub means; hinge means positioned inwardly from said wheel means, said hinge means comprising two hinge members connected by a hinge pivot; generally upright inclined pivot means connecting one end portion of said hinge means with said non-rotatable hub means; and other generally upright inclined pivot means connecting the other end portion of said hinge means with said rigidly supported axle member, the three pivot members of said hinge means being parallel and inclined rearwardly of the vehicle from the lower end upwardly and said hinge means supporting said wheel means for pivotal movement about an axis which is parallel to the pivot members of the hinge means and passes through the center of said ball and which, from its lower end upwardly, is slightly inclined rearwardly relative to the vertical, whereby banking movement of said wheel means is provided simultaneously with steering movement thereof.

3. Mounting means for a motor vehicle wheel comprising an axle member rigid with a frame part of the vehicle; a ball rigid with the outer end portion of said axle member; non-rotatable hub means pivoted on said ball; wheel means rotatively mounted on said non-rotatable hub means; steering means connected with said non-rotatable hub means; hinge means inwardly from said wheel means and comprising two pivotally connected hinge members; generally upright inclined pivot means connecting one of said hinge members with said non-rotatable hub means; and other generally upright inclined pivot means connecting the other hinge member with said rigidly supported axle member, the three pivot members which are connected with said hinge members all being parallel with each other and said hinge means supporting said wheel means for pivotal steering movement about an axis which, from its lower end upwardly, is slightly inclined rearwardly relative to the vertical, providing banking movement of said wheel means simultaneously with steering movement thereof.

4. Mounting means for a motor vehicle wheel comprising an axle member; an upright cross bar rigid with the inner end portion of said axle member; vehicle frame means connected with said cross bar; a hinge shackle pivotally connected with said cross bar for movement on an axis which, from its lower portion upwardly, is inclined rearwardly of the vehicle; a hinge plate having one end portion pivotally connected with said hinge shackle for movement on an axis parallel with said first mentioned axis; a non-rotatable hub member supported for universal pivotal movement on the outer end portion of said axle member; wheel means rotatively mounted on said non-rotatable hub member; steering means connected with said non-rotatable hub member; and pivot means connecting said non-rotatable hub member with the other end portion of said hinge plate, the axis of said last named pivot means being parallel with said two previously mentioned axes, whereby said wheel is supported for simultaneous banking and steering movement on an axis which, from its lower end upwardly is inclined rearwardly of the vehicle.

5. Mounting means for a wheel of a motor vehicle comprising an axle member; an upright cross bar rigid with the inner end portion of said axle member; vehicle frame means fixedly connected with said cross bar; two spaced apart lugs rigid with said cross bar and extending forwardly therefrom; a hinge shackle pivotally connected with said two lugs for pivotal movement on an axis which, from its lower end upwardly is slightly inclined rearwardly relative to the vehicle; a hinge plate having one end portion pivotally connected with said hinge shackle for pivotal movement on an axis parallel with said first mentioned axis; a ball member rigid with the outer end portion of said axle member; a non-rotatable hub member supported for pivotal movement on said ball member; wheel means rotatively mounted on said non-rotatable hub member; steering means connected with said non rotatable hub member; two spaced apart lugs rigidly connected with said non rotatable hub member and extending inwardly therefrom in spaced apart relation; and pivot means connecting said last mentioned lugs with the other end portion of said hinge plate, the axis of said last named pivot means being parallel with said two previously mentioned axes, whereby said wheel is supported for simultaneous banking and steering movement on an axis which, from its lower end upwardly is inclined rearwardly of the vehicle.

ALWIN KOST.
GINO QUILICI.

REFERENCES CITED

The following references are of record in the file of this patent:

UNITED STATES PATENTS

| Number | Name | Date |
|---|---|---|
| 990,073 | Sappington et al. | Apr. 18, 1911 |
| 1,117,451 | Schumacher | Nov. 17, 1914 |
| 1,178,048 | Beard | Apr. 4, 1916 |
| 1,234,923 | Moore | July 31, 1917 |
| 2,025,040 | Christman et al. | Dec. 24, 1935 |
| 2,285,445 | Kost | June 9, 1942 |
| 2,417,316 | McFarland | Mar. 11, 1947 |

FOREIGN PATENTS

| Number | Country | Date |
|---|---|---|
| 15,950 | Great Britain | Aug. 7, 1897 |